United States Patent
Kasahara et al.

(10) Patent No.: US 12,046,974 B2
(45) Date of Patent: Jul. 23, 2024

(54) ACTUATOR

(71) Applicant: NIDEC SANKYO CORPORATION, Nagano (JP)

(72) Inventors: Shogo Kasahara, Nagano (JP); Masaaki Ando, Nagano (JP); Shinji Hatano, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 327 days.

(21) Appl. No.: 17/614,376

(22) PCT Filed: May 18, 2020

(86) PCT No.: PCT/JP2020/019645
§ 371 (c)(1),
(2) Date: Nov. 26, 2021

(87) PCT Pub. No.: WO2020/241355
PCT Pub. Date: Dec. 3, 2020

(65) Prior Publication Data
US 2022/0224213 A1    Jul. 14, 2022

(30) Foreign Application Priority Data
May 30, 2019  (JP) .................................. 2019-100965

(51) Int. Cl.
*H02K 33/16* (2006.01)
*F16F 1/36* (2006.01)
(Continued)

(52) U.S. Cl.
CPC ........... *H02K 33/16* (2013.01); *F16F 1/3605* (2013.01); *H01F 7/081* (2013.01); *H02K 1/34* (2013.01)

(58) Field of Classification Search
CPC ......... H02K 33/00; H02K 33/18; H02K 33/16
(Continued)

(56) References Cited

U.S. PATENT DOCUMENTS 10,252,295 B2    4/2019  Takeda et al.
10,411,575 B2    9/2019  Takeda et al.
(Continued)

FOREIGN PATENT DOCUMENTS

CN    106104992    11/2016
CN    106575913    4/2017
(Continued)

OTHER PUBLICATIONS

"International Search Report (Form PCT/ISA/210) of PCT/JP2020/019645", mailed on Jul. 28, 2020, with English translation thereof, pp. 1-4.
(Continued)

Primary Examiner — Jose A Gonzalez Quinones
(74) Attorney, Agent, or Firm — JCIPRNET

(57) ABSTRACT

In an actuator, damper members which connect a movable member and a fixed member are arranged at two places between the end portion of the shaft of the movable member on an L1 side and the opening portion of the first holder of the fixed member and between the end portion of the shaft of the movable member on an L2 side and the opening portion of a second holder. Each of the damper members includes a gel damper member serving as a connection member which is continuously arranged in a gap in a radial direction between the movable member and the fixed member over the entire circumference. In the gel damper member, an inner circumferential portion is fixed to the shaft through a cylindrical first member, and an outer circumferential portion is fixed to the fixed member through a cylindrical second member.

18 Claims, 11 Drawing Sheets

(51) Int. Cl.
*H01F 7/08* (2006.01)
*H02K 1/34* (2006.01)

(58) Field of Classification Search
USPC .............................................. 310/15, 51, 81
See application file for complete search history.

(56) References Cited

U.S. PATENT DOCUMENTS

| | | | |
|---|---|---|---|
| 2017/0216885 A1* | 8/2017 | Takeda | H01F 7/1615 |
| 2018/0294690 A1 | 10/2018 | Takeda et al. | |
| 2020/0044541 A1 | 2/2020 | Takeda et al. | |
| 2020/0161955 A1 | 5/2020 | Kitahara et al. | |

FOREIGN PATENT DOCUMENTS

| | | |
|---|---|---|
| CN | 107534377 | 1/2018 |
| JP | H10311367 | 11/1998 |
| JP | 2000004569 | 1/2000 |
| JP | 2002055117 A * | 2/2002 |
| JP | 2006097817 | 4/2006 |
| JP | 2015177655 | 10/2015 |
| JP | 2017060207 | 3/2017 |
| JP | 2018088805 | 6/2018 |
| JP | 2019013086 | 1/2019 |
| WO | 2018030267 | 2/2018 |

OTHER PUBLICATIONS

"Office Action of China Counterpart Application", issued on May 11, 2023, with English translation thereof, pp. 1-20.
"Office Action of China Counterpart Application" with English translation thereof, issued on Nov. 24, 2023, p. 1- p. 30.

* cited by examiner (a)

(b)

(a)

(b)

ACTUATOR

CROSS-REFERENCE TO RELATED APPLICATION

This application is a 371 application of the International PCT application serial no. PCT/JP2020/019645, filed on May 18, 2020, which claims the priority benefits of Japan Patent Application No. 2019-100965, filed on May 30, 2019. The entirety of each of the above-mentioned patent applications is hereby incorporated by reference herein and made a part of this specification.

TECHNICAL FIELD

The present invention relates to an actuator which relatively moves a movable member with respect to a fixed member.

BACKGROUND ART

An actuator is provided which includes a fixed member, a movable member and a magnetic drive mechanism for vibrating the movable member relative to the fixed member and in which the movable member and the fixed member are connected with a connection member.

In the actuator of patent literature 1, a connection member is arranged at a place where a movable member and a fixed member (support member) are opposite each other in a direction orthogonal to the direction of vibration of the movable member. The connection member of patent literature 1 is a gel damper member. When the movable member is vibrated on the fixed member (support member), the gel damper member is deformed in a shearing direction.

CITATION LIST

Patent Literature

Patent Literature 1: Japanese Unexamined Patent Application Publication No. 2019-13086

SUMMARY OF THE INVENTION

Problems to be Solved by the Invention

In patent literature 1, the connection member (gel damper member) is arranged at a place where a yoke provided in the movable member and a cover member provided in the fixed member (support member) are opposite each other. Although one surface of the gel damper member in the direction of thickness is adhered to the yoke and the other surface is adhered to the cover member, on the outer circumferential side of the gel damper member, gaps are provided over the entire circumference. Hence, when the movable member is vibrated with a magnetic drive mechanism, the movable member can also be moved in the direction orthogonal to the direction of the vibration, with the result that the movable member is disadvantageously moved in an unintended direction.

In view of the problem described above, an object of the present invention is to reduce, in an actuator in which a movable member and a fixed member are connected with a connection member, the movement of the movable member in a direction other than the direction of vibration.

Means for Solving the Problem

In order to solve the problem described above, an actuator according to the present invention includes: a movable member that includes one of a magnet and a coil; a fixed member that includes the other of the magnet and the coil; and a connection member that connects the fixed member and the movable member, the magnet and the coil form a magnetic drive mechanism that vibrates the movable member relative to the fixed member, one of the movable member and the fixed member includes an inner circumferential side part that is arranged on an inner circumferential side of the other of the movable member and the fixed member, the other of the movable member and the fixed member includes an outer circumferential side part that surrounds an outer circumferential side of the inner circumferential side part, the connection member continuously surrounds an entire circumference of the inner circumferential side part and an inner circumferential portion of the connection member is connected to the inner circumferential side part and an outer circumferential portion of the connection member is connected to the outer circumferential side part.

In the present invention, the connection member which connects the movable member and the fixed member continuously surrounds the inner circumferential side part provided in the one of the movable member and the fixed member over the entire circumference, the inner circumferential portion of the connection member is connected to the one of the movable member and the fixed member and the outer circumferential portion of the connection member is connected to the other of the movable member and the fixed member. As described above, the connection member is continuously arranged between the movable member and the fixed member, and thus when the movable member is vibrated with the magnetic drive mechanism, the connection member is deformed in a shearing direction whereas when the movable member is moved in a direction other than the direction of the vibration, the connection member is deformed in such a direction that the connection member is collapsed. In this way, as compared with a case where the movable member is vibrated, when the movable member is moved in a direction other than the direction of the vibration, the spring constant of the connection member can be increased, with the result that it is possible to reduce the movement of the movable member in a direction different from the direction of the vibration. Hence, it is possible to reduce the movement of the movable member in an unintended direction, and thus it is possible to reduce the collision of the movable member and the fixed member.

In the present invention, the fixed member surrounds an outer circumferential side of the movable member, and the inner circumferential portion of the connection member is connected to the inner circumferential side part provided in the movable member and the outer circumferential portion of the connection member is connected to the outer circumferential side part provided in the fixed member. In this way, when a tactile device is formed in which the movable member is arranged on the inner circumferential side of the fixed member and in which the vibration of the movable member is output through the fixed member to the outside, it is possible to reduce the vibration of the movable member in a direction different from the direction of the vibration, with the result that it is possible to reduce the collision of the movable member and the fixed member.

In the present invention, the connection member preferably connects the movable member and the fixed member on one end side and the other end side of the movable member in a direction of the vibration. In this way, both the ends of the movable member in the direction of the vibration are supported with the connection member. Hence, the movable member can be stably supported, and thus it is possible to reduce the movement of the movable member in an unintended direction.

In the present invention, the connection member is preferably formed with a gel damper member. As the connection member, a gel damper member such as a silicone gel is used, and thus the spring constant when the connection member is deformed in such a direction that the connection member is collapsed is about three times as high as the spring constant when the connection member is deformed in the shearing direction. Hence, the gel damper member is arranged between the movable member and the fixed member over the entire circumference, and thus it is possible to reduce the movement of the movable member in a direction different from the direction of the vibration.

In the present invention, the connection member is preferably cylindrical. In this way, the connection member is uniformly arranged over the entire circumference. Hence, it is possible to cause the spring constant of the connection member to be uniform over the entire circumference. Therefore, the movable member is prevented from being easily moved in a specific direction, and thus it is possible to stably support the movable member.

In the present invention, the height of the inner circumferential portion of the connection member is preferably greater than the height of the outer circumferential portion. In this way, an area difference between an area fixed to the inner circumferential portion and an area fixed to the outer circumferential portion can be reduced, and thus the concentration of stress at the inner circumferential portion can be reduced. The concentration of stress at the connection member is reduced, and thus it is possible to increase the allowable range of an amplitude when the movable member is vibrated. Hence, the movable member can be vibrated with a large amplitude. It is also possible to enhance the durability of the connection member.

Preferably, in the present invention, the inner circumferential portion is connected to the inner circumferential side part over the entire circumference, and part of the outer circumferential portion in a circumferential direction is connected to the outer circumferential side part. In this way, an area difference between an area fixed to the inner circumferential portion and an area fixed to the outer circumferential portion can be reduced, and thus the concentration of stress at the inner circumferential portion can be reduced. The concentration of stress at the connection member is reduced, and thus it is possible to increase the allowable range of an amplitude when the movable member is vibrated. Hence, the movable member can be vibrated with a large amplitude. It is also possible to enhance the durability of the connection member.

Preferably, in the present invention, the connection member is arranged between a cylindrical first member and a cylindrical second member arranged on an outer circumferential side of the first member so as to connect the first member and the second member, the inner circumferential portion is connected through the first member to the inner circumferential side part over the entire circumference and an entire circumference of the outer circumferential portion is connected through the second member to the outer circumferential side part or part of the outer circumferential portion in a circumferential direction is connected through the second member to the outer circumferential side part. As described above, the component obtained by directly molding the gel damper member between the frame member (first member) on the inner circumferential side and the frame member (second member) on the outer circumferential side is manufactured, and thus when the actuator is assembled, the movable member and the fixed member and the gel damper member can be connected through the first member and the second member. Hence, when the actuator is assembled, it is not necessary to provide an operation of adhering the gel damper member and an operational space therefor. Thus, it is possible to efficiently manufacture the actuator.

Preferably, in the present invention, the movable member includes an inner annular member arranged on an inner circumferential side of the connection member, the inner annular member is a weight for adjusting mass of the movable member and the inner circumferential side part to which the connection member is fixed is provided in the inner annular member. In a linear actuator in which the movable member and the fixed member are connected with the connection member, as indicated by formula (1) below, the resonance frequency f0 of the movable member is specified by a formula including the mass m of the movable member and the spring constant k of the connection member.

$$\text{Resonance frequency } f0 = (1/2\Pi) \times \sqrt{(k/m)} \quad (1)$$

k: spring constant of connection member, m: mass of movable member

Hence, the weight is provided in the movable member, and thus the mass m of the movable member is adjusted to be able to set the resonance frequency f0 of the movable member to an appropriate frequency. For example, when the actuator is used as a tactile device, the resonance frequency f0 can be caused to be equal to a frequency for providing a tactile sense desired by a user. The inner annular member to which the connection member is connected is used as the weight, and thus when the mass m of the movable member is adjusted, the outside diameter of the inner annular member is changed to simultaneously change the thickness of the connection member in the radial direction, with the result that the spring constant k of the connection member can be changed. Hence, only by changing the shape of one member (inner annular member), it is possible to simultaneously adjust the two values (k and m) for determining the resonance frequency f0 of the movable member. When the thickness of the connection member in the radial direction is reduced, an area difference between the area of the inner circumferential portion of the connection member fixed to the movable member and the area of the outer circumferential portion of the connection member fixed to the fixed member can be reduced, with the result that the concentration of stress at the inner circumferential portion can be simultaneously reduced.

Preferably, in the present invention, the fixed member includes a holder member including a coil fixing portion on which the coil is wound and an outer annular member fixed to the holder member, and the outer circumferential side part to which the connection member is fixed is provided in the outer annular member. In this way, when the coil is arranged in the fixed member, the outer annular member for connecting the connection member and the holder member including the coil fixing portion are used as separate members, with the result that it is not necessary to perform an operation of directly connecting the connection member to the member on which the coil is wound. Hence, it is possible to efficiently perform an operation of assembling the actuator.

Effect of the Invention

In the present invention, a connection member which connects a movable member and a fixed member continuously surrounds an inner circumferential side part provided in one of the movable member and the fixed member over the entire circumference, the inner circumferential portion of the connection member is connected to the one of the movable member and the fixed member and the outer circumferential portion of the connection member is connected to the other of the movable member and the fixed member. When as described above, the connection member is continuously arranged between the movable member and the fixed member over the entire circumference, and thus the movable member is vibrated with a magnetic drive mechanism, the connection member is deformed in a shearing direction whereas when the movable member is moved in a direction other than the direction of the vibration, the connection member is deformed in such a direction that the connection member is collapsed. In this way, as compared with a case where the movable member is vibrated, when the movable member is moved in a direction other than the direction of the vibration, the spring constant of the connection member can be increased, with the result that it is possible to reduce the movement of the movable member in a direction different from the direction of the vibration. Hence, it is possible to reduce the movement of the movable member in an unintended direction, and thus it is possible to reduce the collision of the movable member and the fixed member.

MODE FOR CARRYING OUT THE INVENTION

Figure 1:
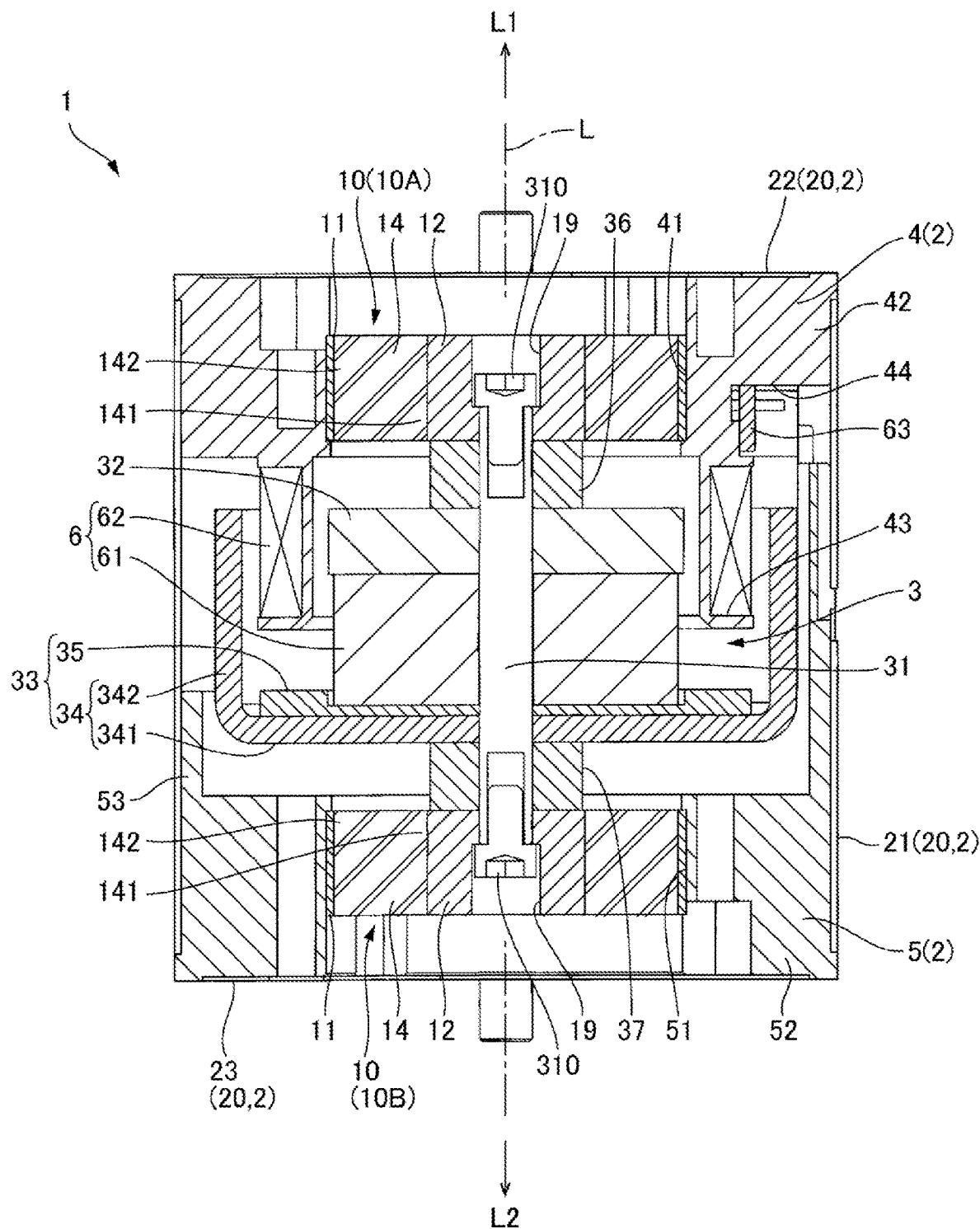
FIG. 1 is a cross-sectional view of an actuator according to embodiment 1 of the present invention.

Embodiments of the present invention will be described below with reference to drawings. In the following description, an axis line L refers to the center axis line of a movable member. One side of a direction (direction of the axis line L) in which the axis line L extends is assumed to be L1, and the other side of the direction of the axis line L is assumed to be L2. In an actuator to which the present invention is applied, the movable member is vibrated on a fixed member in the direction of the axis line L. At least part of one of the movable member and the fixed member is arranged on the inner circumferential side of the other. The movable member and the fixed member are connected with a connection member which is continuously arranged over the entire circumference in a gap in a radial direction between the movable member and the fixed member.

Although in embodiments 1 to 3 below, a description will be given using, as an example, a form in which the fixed member surrounds the outer circumferential side of the movable member, in which the inner circumferential portion of the connection member is connected to the movable member and in which the outer circumferential portion of the connection member is connected to the fixed member, the present invention is also applicable to a configuration in which the arrangements of the movable member and the fixed member are replaced with each other such that the movable member surrounds the outer circumferential side of the fixed member. Although in embodiments 1 to 3, the movable member is connected to the fixed member with the connection member at two places on one side (L1 side) of the direction of the axis line L and on the other side (L2 side), in the present invention, a form in which the connection member is arranged at one or three or more places may be adopted. Furthermore, although in embodiments 1 to 3, a magnetic drive mechanism for vibrating the movable member relative to the fixed member includes a magnet arranged in the movable member and a coil arranged in the fixed member, in the present invention, it is also possible to adopt a configuration in which the arrangements of the magnet and the coil are reversed.

In the present invention, the connection member is a gel damper member which is continuously arranged over the entire circumference in the gap in the radial direction between the movable member and the fixed member. Hence, when the movable member is vibrated in the direction of the axis line L, the gel damper member is deformed in a shearing direction whereas when the movable member is moved in a direction (that is, the radial direction) different from the direction of the vibration (direction of the axis line L), the gel damper member is deformed in such a direction that the gel damper member is collapsed.

Hence, when the movable member is about to be moved in the direction different from the direction of the vibration (direction of the axis line L), since the spring constant of the gel damper member is about three times as high as the spring constant when the movable member is vibrated in the direction of the axis line L, the movable member is unlikely to be moved in the direction different from the direction of the vibration (direction of the axis line L).

Embodiment 1

Overall Configuration

Figure 2:
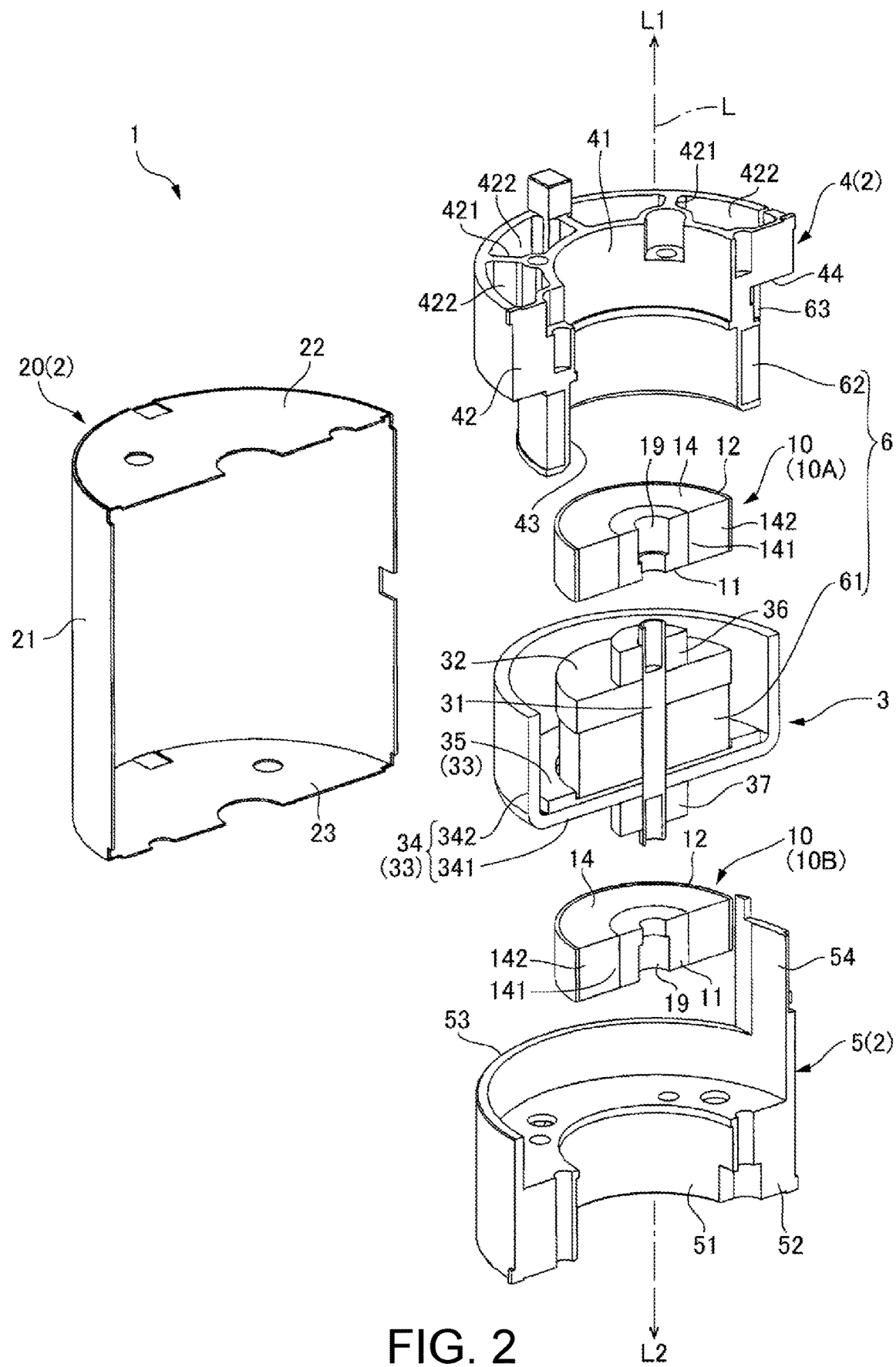
FIG. 2 is an exploded cross-sectional perspective view of the actuator of FIG. 1.

FIG. 1 is a cross-sectional view of an actuator 1 according to embodiment 1 of the present invention. FIG. 2 is an exploded cross-sectional perspective view of the actuator 1 of FIG. 1. As shown in FIGS. 1 and 2, the actuator 1 includes a fixed member 2, a movable member 3, a damper member 10 which connects the fixed member 2 and the movable member 3 and a magnetic drive mechanism 6 which relatively moves the movable member 3 in the direction of the axis line L with respect to the fixed member 2. The magnetic drive mechanism 6 includes a magnet 61 and a coil 62. The magnet 61 is arranged in the movable member 3, and the coil 62 is arranged in the fixed member 2. The movable member 3 is connected to the fixed member 2 through the damper member 10 in each of the positions of an end portion on the L1 side and an end portion on the L2 side. Hence, the damper members 10 are arranged at two places which are separate from each other in the direction of the axis line L.

Fixed Member

The fixed member 2 includes a case 20 and a first holder 4 and a second holder 5 which are held by the case 20. The case 20 includes a tubular case 21 which extends in the direction of the axis line L, a first end plate 22 which is fixed to the end portion of the tubular case 21 on the L1 side and a second end plate 23 which is fixed to the end portion of the tubular case 21 on the L2 side. The first holder 4 and the second holder 5 are arranged inside the tubular case 21. The coil 62 is fixed to the first holder 4, and the damper member 10 is also connected thereto. The damper member 10 is connected to the second holder 5. In the present embodiment, the first holder 4 and the second holder 5 are made of resin, and the case 20 is made of metal.

The first holder 4 includes an annular portion 42 in which a circular opening portion 41 is provided in the center and a coil fixing portion 43 which protrudes from the inner circumferential portion of the annular portion 42 to the L2 side and which is cylindrical. The coil 62 is wound on the outer circumferential side of the coil fixing portion 43. In the opening portion 41, the damper member 10 is arranged.

The outer circumferential surface of the annular portion 42 is a cylindrical surface, and is in contact with the tubular case 21 within the tubular case 21. As shown in FIG. 2, in the annular portion 42, ribs 421 which extend in the radial direction are formed. Between the ribs 421 adjacent to each other in a circumferential direction, a lightening portion 422 is formed. A base plate 63 to which a coil wire is connected is fixed to the annular portion 42. The base plate 63 is arranged in a recess portion 44 which is provided in the outer circumferential surface of the annular portion 42.

The second holder 5 includes an annular portion 52 in which a circular opening portion 51 is provided in the center, a cylindrical portion 53 which protrudes from the outer circumferential edge of the annular portion 52 to the L1 side and a protrusion portion 54 which protrudes from part of the cylindrical portion 53 in the circumferential direction to the L1 side. The tip of the protrusion portion 54 is arranged in the recess portion 44 of the first holder 4. The damper member 10 is arranged inside the opening portion 51. The outer circumferential surface of the annular portion 52 and the cylindrical portion 53 is a cylindrical surface, and is in contact with the tubular case 21 within the tubular case 21.

Movable Member

The movable member 3 includes a shaft 31 which extends in the direction of the axis line L at the center of the fixed member 2 in the radial direction, the magnet 61 which is fixed substantially to the center of the shaft 31 in the direction of the axis line L, a first yoke 32 which is overlaid on the magnet 61 on the L1 side, a second yoke 33 which is overlaid on the magnet 61 on the L2 side, an inner annular member 36 which is overlaid on the first yoke 32 on the L1 side and an inner annular member 37 which is overlaid on the second yoke 33 on the L2 side and which is made of metal. The inner annular members 36 and 37 include shaft holes into which the shaft 31 is fitted. The inner annular members 36 and 37 have the same shape, and are arranged in the direction of the axis line L to be directed in opposite directions. The inner annular members 36 and 37 are weights for adjusting the mass of the movable member 3.

In the actuator 1 in which the movable member 3 and the fixed member 2 are connected with a connection member (gel damper member 14), as indicated by formula (1) below, the resonance frequency f0 of the movable member 3 is specified by a formula including the mass m of the movable member 3 and the spring constant k of the connection member (gel damper member 14).

$$f0 = (1/2\pi) \times \sqrt{(k/m)} \tag{1}$$

k: spring constant of connection member (gel damper member 14), m: mass of movable member 3

The magnet 61 is cylindrical, and is magnetized so as to be polarized into N and S poles in the direction of the axis line L. The shaft 31 extends in the direction of the axis line L at the center of the fixed member 2 in the radial direction. On the outer circumferential side of the magnet 61, the coil fixing portion 43 provided in the first holder 4 is arranged coaxially with the magnet 61. Hence, the magnet 61 and the coil 62 are arranged coaxially.

The first yoke 32 is a magnetic plate whose outside diameter is slightly larger than that of the magnet 61. The outer circumferential surface of the first yoke 32 projects outward in the radial direction beyond the outer circumferential surface of the magnet 61. The first yoke 32 is fixed to the surface of the magnet 61 on the L1 side by a method of adhesion or the like. The second yoke 33 is formed with two magnetic plates (a first magnetic plate 34 and a second magnetic plate 35). The first magnetic plate 34 includes an end plate portion 341 which is arranged on the L2 side of the magnet 61 and a side plate portion 342 which extends from the outer edge of the end plate portion 341 to the L1 side and which is cylindrical. The side plate portion 342 is arranged on the outer circumferential side of the coil fixing portion 43. The second magnetic plate 35 is in the shape of a disk which is slightly smaller than the end plate portion 341 of the first magnetic plate 34. The second magnetic plate 35 is staked on the end plate portion 341 of the first magnetic plate 34 on the L1 side, and is welded to the end plate portion 341. In the second yoke 33, the second magnetic plate 35 is fixed to the surface of the magnet 61 on the L2 side by a method of adhesion or the like.

Damper Member

The damper members 10 are arranged at the two places between the shaft 31 and the first holder 4 and between the shaft 31 and the second holder 5. In the following description, the damper member 10 which connects the shaft 31 and the first holder 4 is assumed to be a first damper member 10A, and the damper member 10 which connects the shaft 31 and the second holder 5 is assumed to be a second damper member 10B. The first damper member 10A and the second damper member 10B have the same configuration, and are arranged in the direction of the axis line L to be directed in opposite directions.

The damper member 10 (the first damper member 10A, the second damper member 10B) includes a cylindrical first member 11, a second member 12 which is arranged on the outer circumferential side of the first member 11 and the gel damper member 14 which is the connection member arranged between the first member 11 and the second member 12. The first member 11 and the second member 12 are cylindrical and are arranged coaxially. The gel damper member 14 is a cylindrical member whose thickness in the radial direction is constant, and a dimension (height) in the direction of the axis line L is also constant. The gel damper member 14 is formed of a silicone gel. For example, as the gel damper member 14, a silicone gel in which the degree of penetration is 90 to 110 degrees can be used.

The inner circumferential portion 141 of the gel damper member 14 is connected to the first member 11, and the outer circumferential portion 142 of the gel damper member 14 is connected to the second member 12. The gel damper member 14 is molded by filling a gel material between the first member 11 and the second member 12 and thermally curing the gel material. When the gel material is thermally cured, parts thereof in contact with a primer 13 (see FIG. 3) which is applied to the outer circumferential surface of the first member 11 and the inner circumferential surface of the second member 12 react, and thus the gel material is fixed to the surfaces to which the primer 13 is applied. Hence, the gel damper member 14 does not need to be fixed to the first member 11 and the second member 12 with an adhesive after the curing, and, by the adhesive force of the gel damper member 14 itself reacting with the primer 13, the inner circumferential portion 141 is connected to the first member 11 and the outer circumferential portion 142 is connected to the second member 12.

Attachment Structure of Damper Member

The first damper member 10A which connects the shaft 31 and the first holder 4 is arranged in the opening portion 41 of the first holder 4. The second member 12 of the first damper member 10A is fixed to the inner surface of the opening portion 41 by adhesion or the like. The first member 11 of the first damper member 10A is fixed to the end portion of the shaft 31 on the L1 side with a bolt 310 arranged in a shaft hole 19 penetrating the center part of the first member 11. In this way, the first holder 4 and the shaft 31 are connected with the first damper member 10A. The first member 11 abuts on the inner annular member 36 from the L1 side.

The second damper member 10B which connects the shaft 31 and the second holder 5 is arranged in the opening portion 51 of the second holder 5. The second member 12 of the second damper member 10B is fixed to the inner surface of the opening portion 51 by adhesion or the like. The first member 11 of the second damper member 10B is fixed to the end portion of the shaft 31 on the L2 side with a bolt 310 arranged in a shaft hole 19. In this way, the second holder 5 and the shaft 31 are connected with the second damper member 10B. The first member 11 abuts on the inner annular member 37 from the L2 side.

Operation of Actuator

In the actuator 1, the coil 62 is energized, and thus the magnetic drive mechanism 6 generates a drive force for driving the movable member 3 in the direction of the axis line L. When the energization of the coil 62 is stopped, the movable member 3 is returned to an origin position by the restoration force of the gel damper member 14. Hence, the coil 62 is intermittently energized, and thus the movable member 3 is vibrated in the direction of the axis line L.

The first damper member 10A includes the gel damper member 14 which surrounds the end portion of the shaft 31 on the L1 side over the entire circumference between the shaft 31 and the first holder 4. The second damper member 10B includes the gel damper member 14 which surrounds the end portion of the shaft 31 on the L2 side over the entire circumference between the shaft 31 and the second holder 5. In the first damper member 10A and the second damper member 10B, the gel damper member 14 is filled between the first member 11 and the second member 12 without any gap, and is continuously arranged over the entire circumference. When the movable member 3 is vibrated on the fixed member 2 in the direction of the axis line L, the first member 11 fixed to the inner circumferential portion 141 of the gel damper member 14 and the second member 12 fixed to the outer circumferential portion 142 of the gel damper member 14 are relatively moved in the direction of the axis line L. Hence, the gel damper member 14 is deformed in a shearing direction so as to follow the vibration of the movable member 3.

Method for Manufacturing Damper Member

Figure 3:
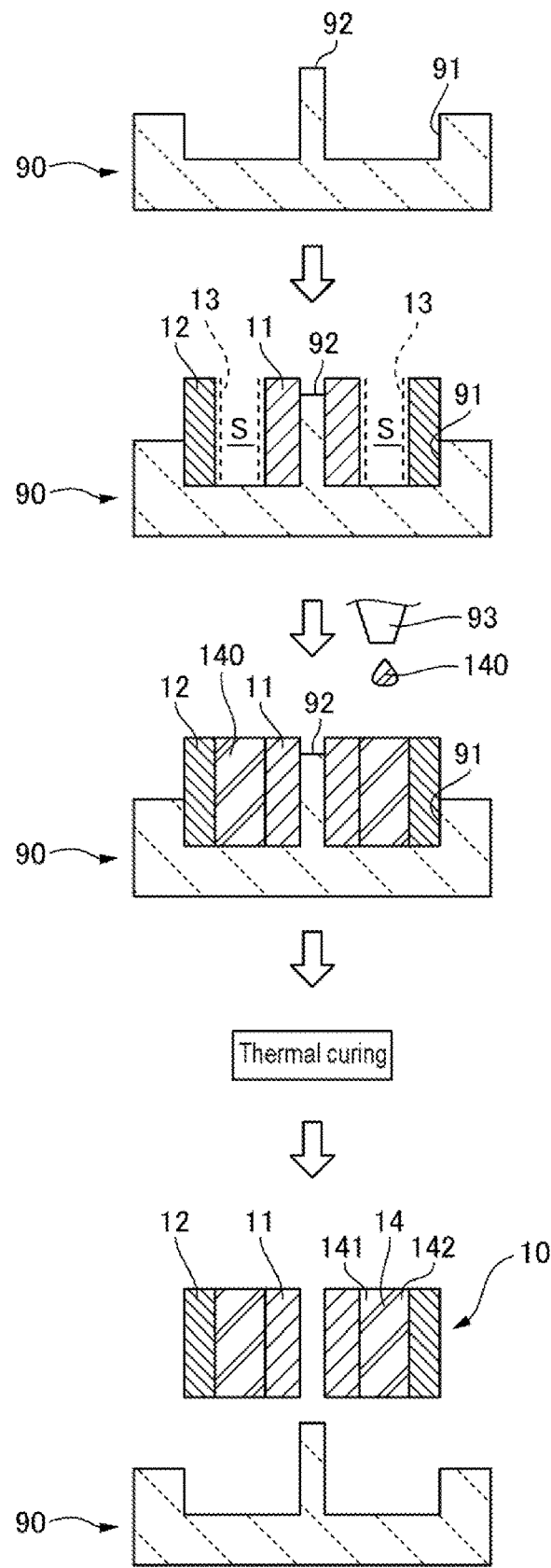
FIG. 3 is an illustrative view of a method for manufacturing a damper member.

FIG. 3 is an illustrative view of a method for manufacturing the damper member 10. A manufacturing jig 90 used in the manufacturing of the damper member 10 includes a circular recess portion 91 and a pin 92 which protrudes from the center of the bottom surface of the circular recess portion 91. The method for manufacturing the damper member 10 includes a first step for mounting the first member 11 and the second member 12 on the manufacturing jig 90, a second step for filling the gel material 140 in a gap S between the first member 11 and the second member 12, a third step for thermally curing the gel material 140 and a fourth step for removing the damper member 10 from the manufacturing jig 90.

In the first step, the first member 11 and the second member 12 are caused to abut on the manufacturing jig 90 so as to be located, and thus the gap S in the radial direction is formed between the first member 11 and the second member 12. As shown in FIG. 3, in the first step, the pin 92 protruding from the center of the circular recess portion 91 is inserted into the shaft hole 19 of the first member 11, and the first member 11 is caused to abut on the bottom surface of the circular recess portion 91 from the L1 side. The second member 12 is bought into contact with the inner circumferential surface of the circular recess portion 91 within the circular recess portion 91, and the second member 12 is caused to abut on the outer circumferential region of the bottom surface of the circular recess portion 91. In this way, the first member 11 and the second member 12 are located in the direction of the axis line L and in the radial direction, and the annular gap S is formed between the first member 11 and the second member 12. The annular gap S is formed over the entire circumference, and its width in the radial direction is constant over the entire circumference.

In the second step, the gel material 140 before being cured is filled in the gap S in the radial direction formed between the first member 11 and the second member 12. As shown in FIG. 3, in the second step, a given amount of gel material 140 is discharged from a dispenser 93 into the gap S. Here, before the gel material 140 before being cured is filled in the gap S, the primer 13 is applied to the outer circumferential surface of the first member 11 and the inner circumferential surface of the second member 12 serving as the surfaces to be in contact with the gel material 140. The operation of applying the primer 13 may be performed before or after the first member 11 and the second member 12 are mounted on the manufacturing jig 90.

In the third step, the gel material 140 is heated together with the manufacturing jig 90 and is maintained at a specified temperature for a specified time so as to be cured. In this way, in the gap S, the gel damper member 14 is formed. When the gel material 140 is thermally cured, the parts thereof in contact with the primer 13 react, and thus the gel material 140 is fixed to the outer circumferential surface of the first member 11 and the inner circumferential surface of the second member 12. Hence, in the gel damper member 14 after being cured, without use of an adhesive, by the adhesive force of the gel damper member 14 itself, the inner circumferential portion 141 of the gel damper member 14 is fixed to the first member 11, and the outer circumferential portion 142 of the gel damper member 14 is fixed to the second member 12.

In the fourth step, the completed damper member 10 is removed from the manufacturing jig 90. For example, in the surface of the manufacturing jig 90 on which the first member 11 abuts and the surface on which the second member 12 abuts, through holes for arranging ejection pins are provided, and the ejection pins are used to remove the damper member 10 from the manufacturing jig 90. In this way, it is possible to obtain the damper member 10 in which the first member 11 and the second member 12 are connected with the gel damper member 14.

Main Effects of Embodiment 1

As described above, in the actuator 1 of embodiment 1, the damper members 10 which connect the movable member 3 and the fixed member 2 are arranged at the two places between the end portion of the shaft 31 on the L1 side which is an inner circumferential side part provided in the movable member 3 and the opening portion 41 of the first holder 4 which is an outer circumferential side part provided in the fixed member 2 and between the end portion of the shaft 31 on the L2 side which is an inner circumferential side part provided in the movable member 3 and the opening portion 51 of the second holder 5. Each of the damper members 10 includes the gel damper member 14 serving as the connection member which is continuously arranged in the gap in the radial direction between the movable member 3 and the fixed member 2 over the entire circumference, and in the gel damper member 14, the inner circumferential portion 141 is fixed to the shaft 31 through the first member 11, and the outer circumferential portion 142 is fixed to the fixed member 2 through the second member 12.

In the configuration described above, when the movable member 3 is vibrated in the direction of the axis line L with the magnetic drive mechanism 6, the gel damper member 14 is deformed in the shearing direction whereas when the movable member 3 is moved in the radial direction, the gel damper member 14 is deformed in such a direction that the gel damper member 14 is collapsed. Since the spring constant when the gel damper member 14 is deformed in such a direction that the gel damper member 14 is collapsed is about three times as high as the spring constant when the gel damper member 14 is deformed in the shearing direction, the damper member 10 of embodiment 1 is used, and thus it is possible to reduce the movement of the movable member 3 in a direction different from the direction of the vibration (direction of the axis line L).

Hence, it is possible to reduce the movement of the movable member 3 in an unintended direction, and thus it is possible to reduce the collision of the movable member 3 and the fixed member 2.

In the actuator 1 of embodiment 1, the damper members 10 are arranged on one end side (L1 side) of the movable member 3 in the direction of the vibration (direction of the axis line L) and on the other end side (L2 side), and in each of the positions of the one end side (L1 side) of the movable member 3 and on the other end side (L2 side), the movable member 3 and the fixed member 2 are connected with the gel damper member 14. As described above, both the ends of the movable member 3 in the direction of the vibration are supported with the gel damper member 14, and thus the movable member 3 can be stably supported. It is also possible to reduce the movement of the movable member 3 in an unintended direction.

In embodiment 1, the gel damper member 14 is cylindrical, and thus the spring constant when the gel damper member 14 is deformed in such a direction that the gel damper member 14 is collapsed is uniform in the circumferential direction. Hence, it is possible to reduce the movement of the movable member 3 in a direction different from the direction of the vibration. Since the thickness of the gel damper member 14 in the radial direction is constant over the entire circumference, the spring constant of the gel damper member 14 is constant over the entire circumference. Hence, the movable member 3 is prevented from being easily moved in a specific direction, and thus it is possible to stably support the movable member 3.

The actuator 1 of embodiment 1 includes the magnetic drive mechanism 6 which vibrates the movable member 3 on the fixed member 2, the magnet 61 is fixed to the outer circumferential surface of the shaft 31 and the coil 62 is wound on the annular coil fixing portion 43 which is arranged so as to surround the outer circumferential side of the magnet 61. The movable member 3 includes the first yoke 32 and the second yoke 33, and the second yoke 33 includes the side plate portion 342 arranged on the outer circumferential side of the coil fixing portion 43. In the configuration described above, with a simple structure, a large drive force can be obtained, and thus it is possible to increase the output of the actuator 1.

In embodiment 1, the damper member 10 includes the tubular first member 11 and the second member 12 which is arranged on the outer circumferential side of the first member 11 and which is tubular, and the first member 11 and the second member 12 are connected with the gel damper member 14 serving as the connection member. In a case where as described above, the gel damper member 14 is molded between the two frame members into a component, when the actuator 1 is assembled, it is not necessary to perform an operation of adhering the gel damper member 14, with the result that it is not necessary to provide an operational space therefor. Hence, it is possible to efficiently manufacture the actuator 1.

In embodiment 1, when the damper member 10 is manufactured, the gel material 140 is filled between the outer circumferential surface of the first member 11 and the inner circumferential surface of the second member 12 to which the primer 13 is applied and is thermally cured, and thus the primer 13 and the gel material are caused to react with each other, with the result that, by the adhesive force of the gel damper member 14 itself, the first member 11 and the second member 12 are connected to the gel damper member 14. Hence, even in a step for manufacturing the damper member 10, it is not necessary to perform the operation of adhering the gel damper member 14, and it is also not necessary to handle the gel damper member 14 as a single member. A step for curing the gel material 140 does not need to be performed on the main parts of the movable member 3 and the fixed member 2. Hence, it is possible to efficiently manufacture the actuator 1.

EMBODIMENT 2

Overall Configuration

Figure 4:
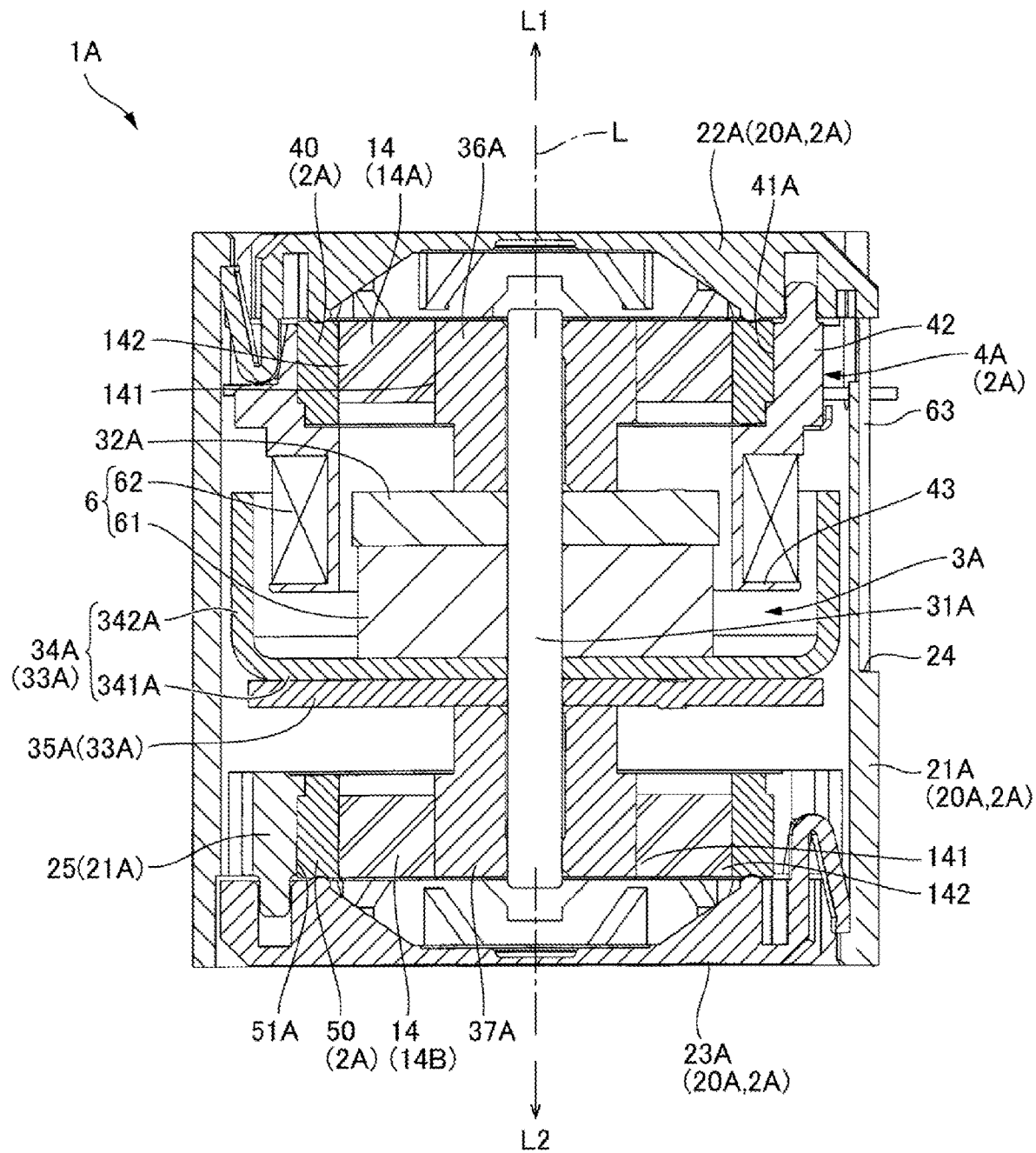
FIG. 4 is a cross-sectional view of an actuator according to embodiment 2 of the present invention.
Figure 5:
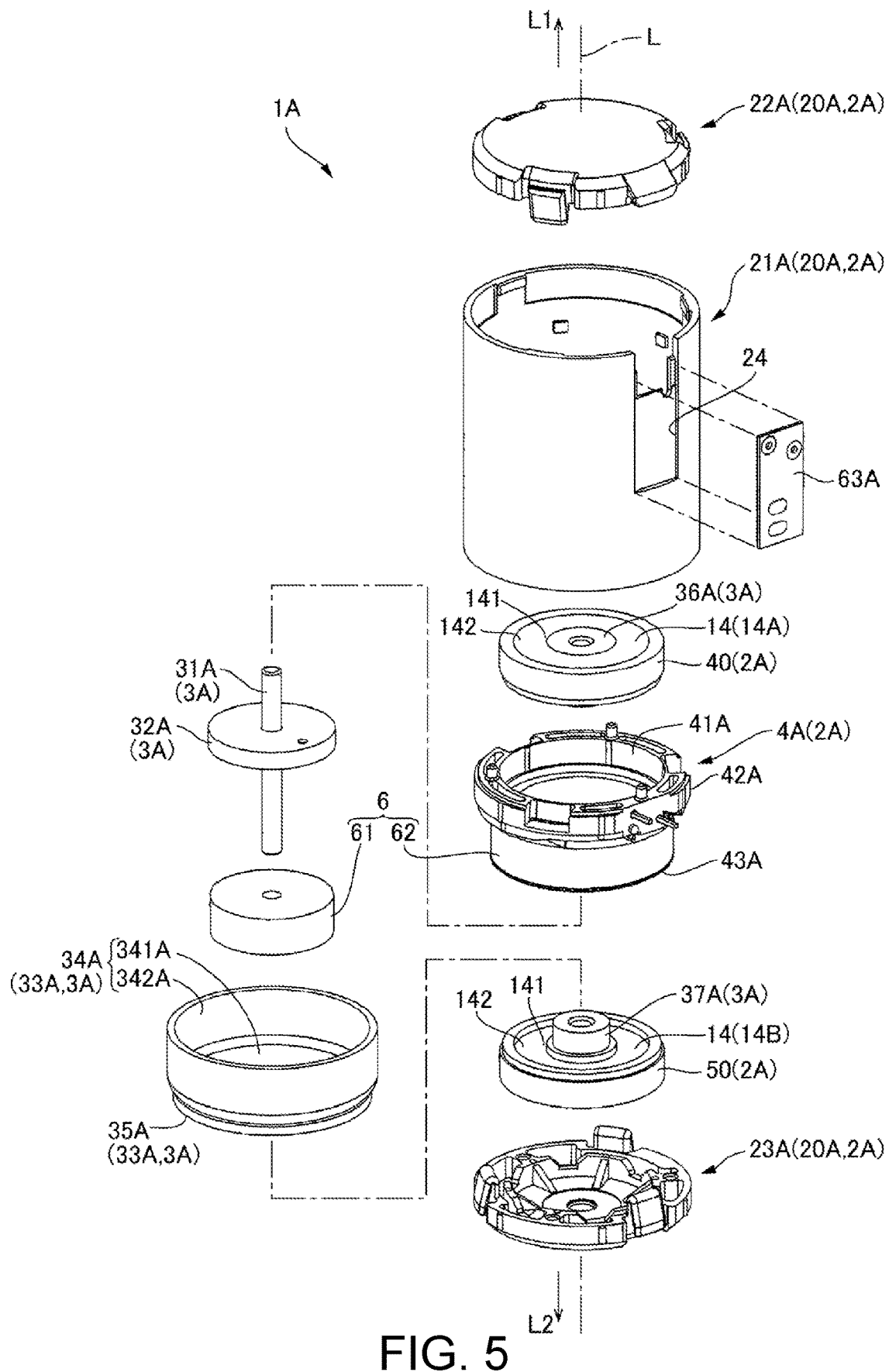
FIG. 5 is an exploded perspective view when the actuator of FIG. 4 is seen from an L1 side.
Figure 6:
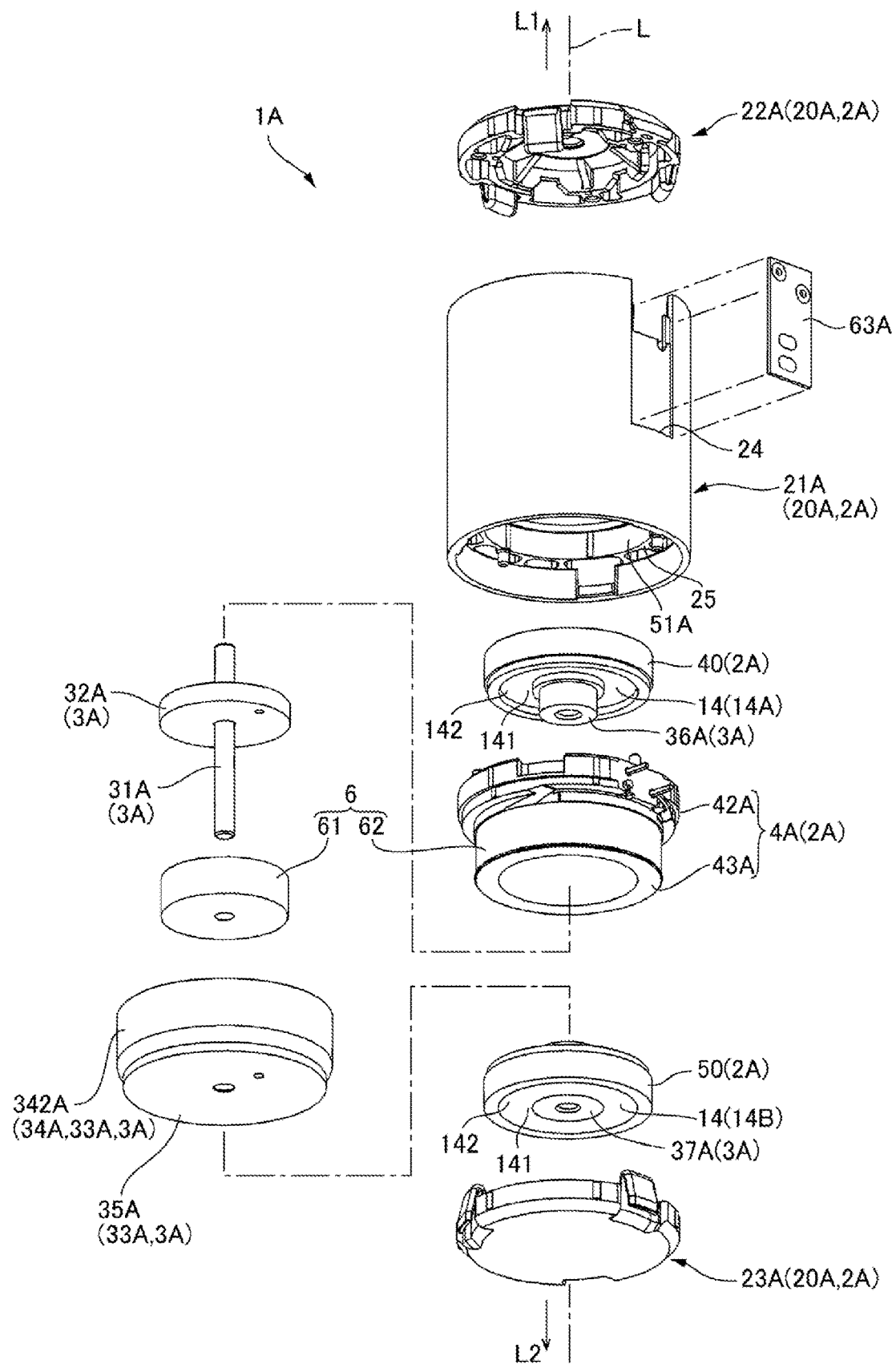
FIG. 6 is an exploded perspective view when the actuator of FIG. 4 is seen from an L2 side.

FIG. 4 is a cross-sectional view of an actuator 1A according to embodiment 2 of the present invention. FIG. 5 is an exploded perspective view when the actuator 1A of FIG. 4 is seen from the L1 side. FIG. 6 is an exploded perspective view when the actuator 1A of FIG. 4 is seen from the L2 side. In the following description, the same configurations as in embodiment 1 are identified with the same symbols, and the descriptions thereof will be omitted. As shown in FIGS. 4 to 6, the actuator 1A includes a fixed member 2A, a movable member 3A, a gel damper member 14 serving as a connection member which connects the fixed member 2A and the movable member 3A and a magnetic drive mechanism 6 which relatively moves the movable member 3A in the direction of the axis line L with respect to the fixed member 2A. As in embodiment 1, the magnetic drive mechanism 6 includes a magnet 61 arranged in the movable member 3A and a coil 62 arranged in the fixed member 2A.

In the actuator 1A of embodiment 2, the gel damper member 14 is not previously molded between frame members (the first member 11 and the second member 12 of embodiment 1) into a component as the damper member 10, and the gel damper members 14 are molded between components (inner annular members 36A and 37A which will be described later) on the side of the movable member 3A and components (outer annular members 40 and 50) on the side of the fixed member 2A. In each of the positions of the end portion of the movable member 3A on the L1 side and the end portion on the L2 side, the gel damper member 14 is arranged in a gap in the radial direction between the fixed member 2A and the movable member 3A. In the following description, the gel damper member 14 arranged in the end portion of the movable member 3A on the L1 side is assumed to be a first gel damper member 14A, and the gel damper member 14 arranged in the end portion of the movable member 3A on the L2 side is assumed to be a second gel damper member 14B.

Fixed Member

The fixed member 2A includes a case 20A which is made of resin, a holder 4A (holder member) which is held by the case 20A and the outer annular members 40 and 50. The outer annular members 40 and 50 have the same shape and are arranged in the direction of the axis line L to be directed in opposite directions. The case 20A of embodiment 2 includes a tubular case 21A, a first lid member 22A which is fixed to the end portion of the tubular case 21A on the L1 side and a second lid member 23A which is fixed to the end portion of the tubular case 21A on the L2 side. A base plate 63A to which a coil wire is connected is fixed to the tubular case 21A. The base plate 63A is arranged in a recess portion 24 provided in the outer circumferential surface of the tubular case 21A.

The holder 4A includes an annular portion 42A which is fixed to the L2 side of the first lid member 22A and a coil fixing portion 43A which protrudes from the annular portion 42A to the L2 side. In the inner circumferential portion of the annular portion 42A, an annular recess portion 41A which is recessed toward the L2 side is provided, and the outer annular member 40 is fixed to the annular recess portion 41A. The outer annular member 40 is fixed to the outer circumferential portion 142 of the first gel damper member 14A.

As shown in FIG. 6, the tubular case 21A includes a case side annular portion 25 which protrudes from the position of the second lid member 23A on the L1 side to the inner circumferential side. The second lid member 23A is fixed to the case side annular portion 25 from the L2 side. The case side annular portion 25 includes a circular opening portion 51A, and the outer annular member 50 is fixed to the opening portion 51A. The outer annular member 50 is fixed to the outer circumferential portion 142 of the second gel damper member 14B.

Movable Member

The movable member 3A includes a shaft 31A which extends in the direction of the axis line L at the center of the fixed member 2A in the radial direction, the magnet 61 which is fixed substantially to the center of the shaft 31A in the direction of the axis line L, a first yoke 32A which is overlaid on the magnet 61 on the L1 side, a second yoke 33A which is overlaid on the magnet 61 on the L2 side, the inner annular member 36A which is overlaid on the first yoke 32A on the L1 side and the inner annular member 37A which is overlaid on the second yoke 33A on the L2 side and which is made of metal. The inner annular members 36A and 37A include shaft holes into which the shaft 31A is fitted. The inner annular members 36A and 37A have the same shape, and are arranged in the direction of the axis line L to be directed in opposite directions. As in embodiment 1, the inner annular members 36A and 37A are weights for adjusting the mass of the movable member 3A.

In embodiment 2, the first magnetic plate 34A of the second yoke 33A includes an end plate portion 341A which is fixed to the surface of the magnet 61 on the L2 side by a method of adhesion or the like and a side plate portion 342A which extends from the outer edge of the end plate portion 341A to the L1 side and which is cylindrical. The second magnetic plate 35A of the second yoke 33A abuts on the end plate portion 341A from the L2 side.

Gel Damper Member

In embodiment 2, as the gel damper members 14, the first gel damper member 14A arranged between the inner annular member 36A attached to the end portion of the shaft 31A on the L1 side and the outer annular member 40 and the second gel damper member 14B arranged between the inner annular member 37A attached to the end portion of the shaft 31A on the L2 side and the outer annular member 50 are provided. The gel damper member 14 is a cylindrical member whose thickness in the radial direction is constant, and a dimension (height) in the direction of the axis line L is also constant. The gel damper member 14 is formed of a silicone gel. For example, as the gel damper member 14, a silicone gel in which the degree of penetration is 90 to 110 degrees can be used.

In the first gel damper member 14A, an inner circumferential portion 141 is connected to the inner annular member 36A, and an outer circumferential portion 142 is connected to the outer annular member 40. In the second gel damper member 14B, an inner circumferential portion 141 is connected to the inner annular member 37A, and an outer circumferential portion 142 is connected to the outer annular member 50. When the first gel damper member 14A and the second gel damper member 14B are connected to the members arranged on the inner circumferential side and the outer circumferential side thereof, the same method as used for molding the gel damper member 14 between the first member 11 and the second member 12 in embodiment 1 is performed.

For example, the inner annular member 36A and the outer annular member 40 are mounted on a jig to form a predetermined gas between the inner annular member 36A and the outer annular member 40, and the gel material is filled in the gap and is thermally cured. Before the gel material is filled, a primer 13 is applied to the outer circumferential surface of the inner annular member 36A and the inner circumferential surface of the outer annular member 40. In this way, when the gel material is thermally cured, the parts thereof in contact with the primer 13 react, and, by the adhesive force of the first gel damper member 14A itself, the inner circumferential portion 141 of the first gel damper member 14A is fixed to the inner annular member 36A and the outer circumferential portion 142 of the first gel damper member 14A is fixed to the outer annular member 40. The second gel damper member 14B is also molded between the inner annular member 37A and the outer annular member 50 by the same method.

In the actuator 1A of embodiment 2, as in embodiment 1, the coil 62 is energized, and thus the magnetic drive mechanism 6 generates a drive force for driving the movable member 3A in the direction of the axis line L, with the result that the movable member 3A is vibrated in the direction of the axis line L. The gel damper members 14 are filled between the inner annular member 36A and the outer annular member 40 and between the inner annular member 37A and the outer annular member 50 without any gap, and are continuously arranged over the entire circumference. When the movable member 3A is vibrated on the fixed member 2A in the direction of the axis line L, the gel damper member 14 is deformed in the shearing direction so as to follow the vibration of the movable member 3A.

Main Effects of Embodiment 2

As described above, in the actuator 1A of embodiment 2, the gel damper members 14 serving as the connection members which connect the movable member 3A and the fixed member 2A are arranged at the two places between the inner annular member 36A which is an inner circumferential side part provided in the movable member 3 and the outer annular member 40 which is an outer circumferential side part provided in the fixed member 2A and between the inner annular member 37A which is an inner circumferential side part provided in the movable member 3A and the outer annular member 50 which is an outer circumferential side part provided in the fixed member 2A. Each of the gel damper members 14 is continuously arranged in the gap in the radial direction between the movable member 3A and the fixed member 2A over the entire circumference, the inner circumferential portion 141 of the gel damper member 14 is connected to the movable member 3A and the outer circumferential portion 142 of the gel damper member 14 is connected to the fixed member 2A. Hence, it is possible to reduce the movement of the movable member 3A in a direction different from the direction of the vibration (direction of the axis line L).

Therefore, it is possible to reduce the movement of the movable member 3A in an unintended direction, and thus it is possible to reduce the collision of the movable member 3A and the fixed member 2A.

Embodiment 2 is the same as embodiment 1 in that the gel damper members 14 are arranged at both the ends of the movable member 3A in the direction of the axis line L and that the gel damper members 14 are cylindrical. Hence, in these respects, the same operational effects as in embodiment 1 can be obtained.

In embodiment 2, the weights (inner annular members 36A and 37A) for adjusting the mass of the movable member 3A are used as the frame members to which the inner circumferential portions 141 of the gel damper members 14 are connected. As described above, the frame members are also used as the weights, and thus it is possible to reduce the number of components. When the gel damper members 14 are molded, as the members on the side of the movable member 3A, the inner annular members 36A and 37A are preferably used, with the result that it is not necessary to mold the gel damper members 14 on the main parts of the movable member 3A. Therefore, it is possible to efficiently manufacture the actuator 1.

In embodiment 2, the holder 4A (holder member) including the coil fixing portion 43A and the outer annular members 40 and 50 used as the frame members when the gel damper members 14 are molded are used as separate components, and the outer annular member 40 is fixed to the holder 4A (holder member). Hence, when the gel damper members 14 are molded, as the components on the side of the fixed member 2A, the outer annular members 40 and 50 are preferably used, with the result that it is not necessary to mold the gel damper member 14 for the component on which the coil 62 is wound. Therefore, it is possible to efficiently manufacture the actuator 1.

In embodiment 2, when the gel damper member 14 is manufactured, the gel material 140 is filled between the component on the side of the movable member 3A and the component on the side of the fixed member 2A to which the primer 13 is applied and is thermally cured, and thus the primer 13 and the gel material are caused to react with each other, with the result that, by the adhesive force of the gel damper member 14 itself, the component on the side of the movable member 3A and the component on the side of the fixed member 2A are connected. Hence, in a step for manufacturing the actuator 1, it is not necessary to perform an operation of adhering the gel damper member 14, with the result that it is not necessary to provide an operational space therefor. Therefore, it is possible to efficiently manufacture the actuator 1.

Embodiment 3

Overall Configuration

Figure 7:
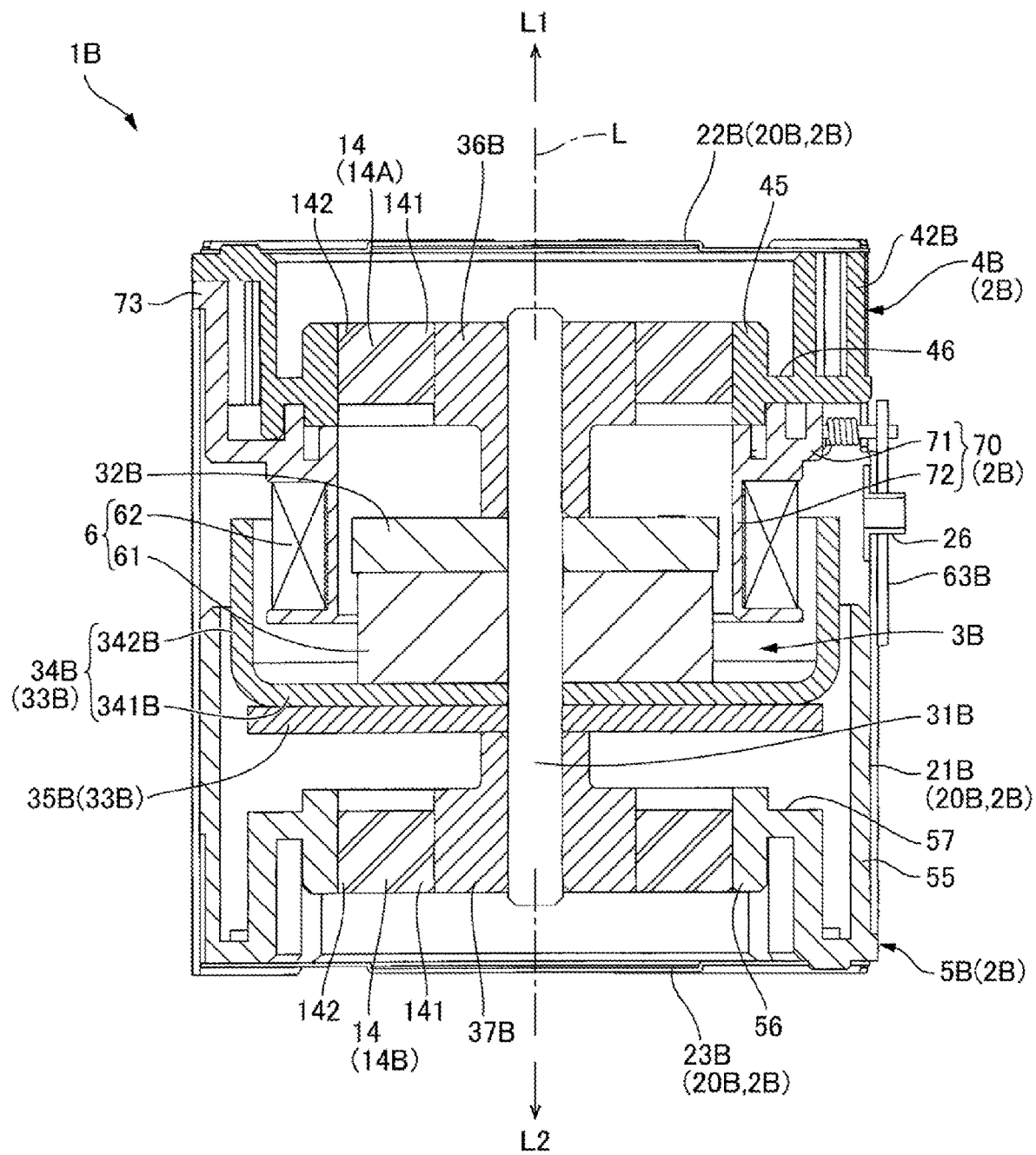
FIG. 7 is a cross-sectional view of an actuator according to embodiment 3 of the present invention.
Figure 8:
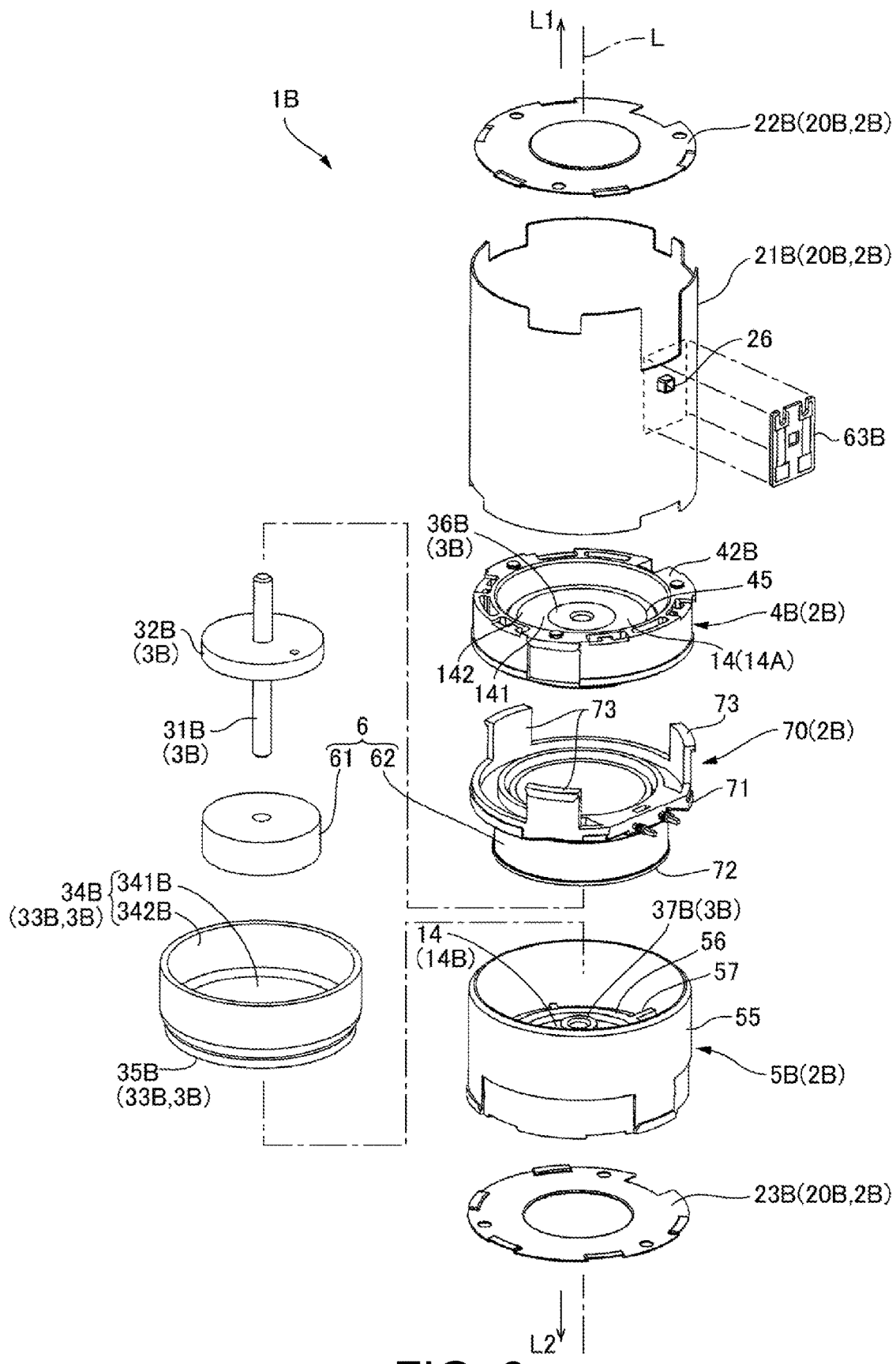
FIG. 8 is an exploded perspective view when the actuator of FIG. 7 is seen from the L1 side.
Figure 9:
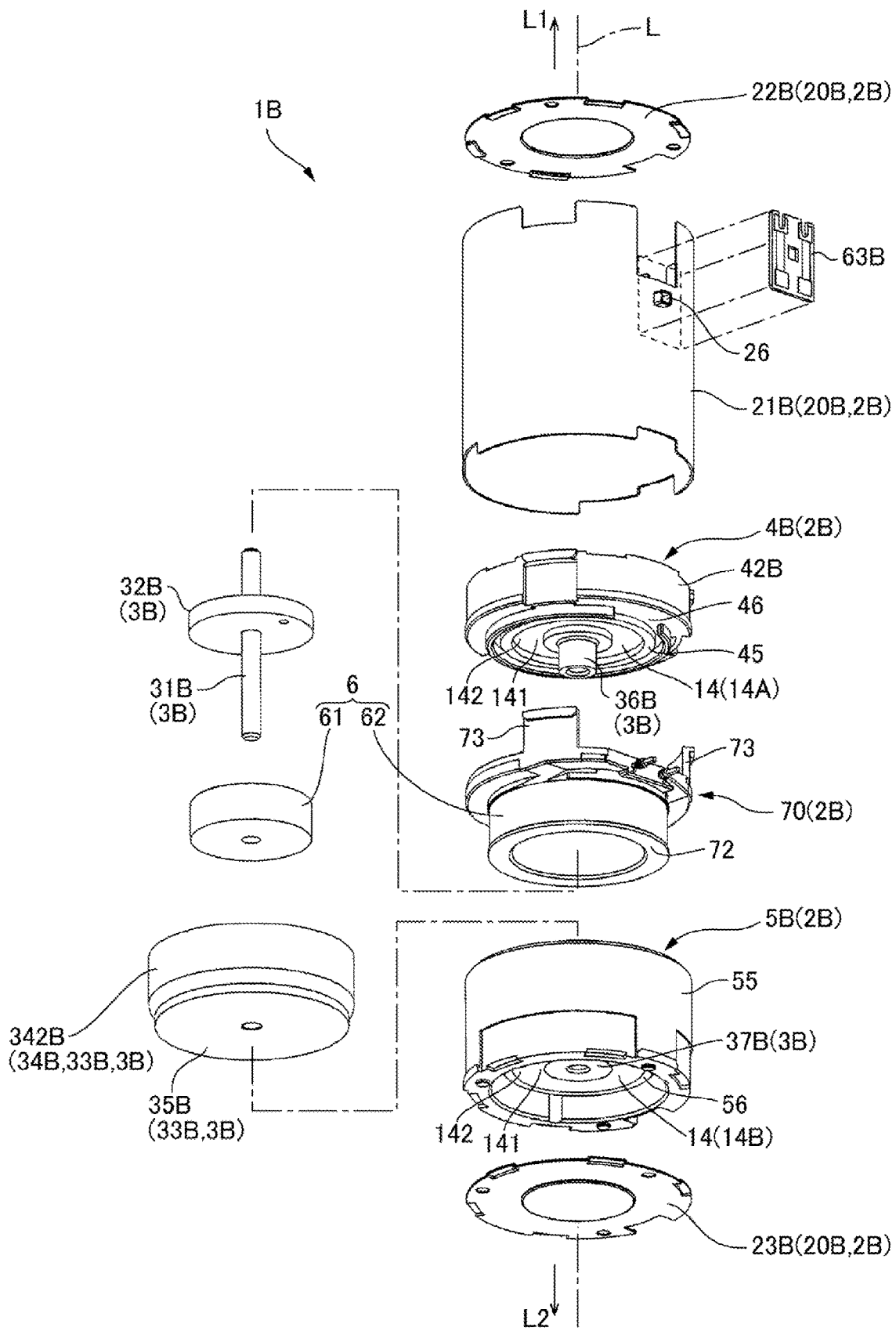
FIG. 9 is an exploded perspective view when the actuator of FIG. 7 is seen from the L2 side.

FIG. 7 is a cross-sectional view of an actuator 1B according to embodiment 3 of the present invention. FIG. 8 is an exploded perspective view when the actuator 1B of FIG. 7 is seen from the L1 side. FIG. 9 is an exploded perspective view when the actuator 1B of FIG. 7 is seen from the L2 side. In the following description, the same configurations as in embodiments 1 and 2 are identified with the same symbols, and the descriptions thereof will be omitted. As shown in FIGS. 7 to 9, the actuator 1B includes a fixed member 2B, a movable member 3B, a gel damper member 14 serving as a connection member which connects the fixed member 2B and the movable member 3B and a magnetic drive mechanism 6 which relatively moves the movable member 3B in the direction of the axis line L with respect to the fixed member 2B. As in embodiments 1 and 2, the magnetic drive mechanism 6 includes a magnet 61 arranged in the movable member 3B and a coil 62 arranged in the fixed member 2B.

In the actuator 1B of embodiment 3, as in embodiment 2, the gel damper members 14 are molded between components (inner annular members 36B and 37B which will be described later) on the side of the movable member 3B and components (a first holder 4B and a second holder 5B) on the side of the fixed member 2B. In each of the positions of the end portion of the movable member 3B on the L1 side and the end portion on the L2 side, the gel damper member 14 is arranged in a gap in the radial direction between the fixed member 2B and the movable member 3B. In the following description, the gel damper member 14 arranged in the end portion of the movable member 3B on the L1 side is assumed to be a first gel damper member 14A, and the gel damper member 14 arranged in the end portion of the movable member 3B on the L2 side is assumed to be a second gel damper member 14B.

Fixed Member

The fixed member 2 includes a case 20B which is made of metal, the first holder 4B and the second holder 5B held by the case 20B and a coil holder 70. The case 20B of embodiment 3 includes a tubular case 21B, a first end plate 22B which is fixed to the end portion of the tubular case 21B on the L1 side and a second end plate 23B which is fixed to the end portion of the tubular case 21B on the L2 side. A base plate 63B to which a coil wire is connected is fixed to the tubular case 21B. The base plate 63B is fixed to a fixing component 26 which protrudes from the outer circumferential surface of the tubular case 21B.

The first holder 4B (outer annular member) includes an annular portion 42B which is fixed to the inner side of the end portion of the tubular case 21B on the L1 side, a frame part 45 which is arranged on the inner circumferential side of the annular portion 42B and a connection portion 46 which connects the annular portion 42B and the frame part 45. As will be described later, the outer circumferential portion 142 of the gel damper member 14 is fixed to the frame part 45. The coil holder 70 (holder member) includes a holder fixing portion 71 which is fixed to the first holder 4B from the L1 side and a coil fixing portion 72 which protrudes from the holder fixing portion 71 to the L2 side. As shown in FIGS. 8 and 9, the holder fixing portion 71 includes hooks 73 which protrude from three places separate in the circumferential direction to the L1 side. The hooks 73 are arranged in recess portions 47 provided in the outer circumferential surface of the first holder 4B, and the tips of the hooks 73 are locked on the edge of the tubular case 21B.

The second holder 5B includes a cylindrical portion 55 which is fixed to the inner side of the end portion of the tubular case 21B on the L2 side, a frame part 56 which is arranged on the inner circumferential side of the cylindrical portion 55 and a connection portion 57 which connects the cylindrical portion 55 and the frame part 56. As will be described later, the outer circumferential portion 142 of the gel damper member 14 is fixed to the frame part 56.

Movable Member

The movable member 3B includes a shaft 31B which extends in the direction of the axis line L at the center of the fixed member 2B in the radial direction, the magnet 61 which is fixed substantially to the center of the shaft 31B in the direction of the axis line L, a first yoke 32B which is overlaid on the magnet 61 on the L1 side, a second yoke 33B which is overlaid on the magnet 61 on the L2 side, an inner annular member 36B which is overlaid on the first yoke 32B on the L1 side and an inner annular member 37B which is overlaid on the second yoke 33B on the L2 side and which is made of metal. The inner annular members 36B and 37B include shaft holes into which the shaft 31B is fitted. The inner annular members 36B and 37B have the same shape, and are arranged in the direction of the axis line L to be directed in opposite directions. As in embodiments 1 and 2, the inner annular members 36B and 37B are weights for adjusting the mass of the movable member 3B.

In embodiment 3, the first magnetic plate 34B of the second yoke 33B includes an end plate portion 341B which is fixed to the surface of the magnet 61 on the L2 side by a method of adhesion or the like and a side plate portion 342B which extends from the outer edge of the end plate portion 341B to the L1 side and which is cylindrical. The second magnetic plate 35B of the second yoke 33B abuts on the end plate portion 341B from the L2 side.

Gel Damper Member

In embodiment 3, as the gel damper members 14, the first gel damper member 14A arranged between the inner annular member 36B attached to the end portion of the shaft 31B on the L1 side and the frame part 45 of the first holder 4B and the second gel damper member 14B arranged between the inner annular member 37B attached to the end portion of the shaft 31B on the L2 side and the frame part 56 of the second holder 5B are provided. The gel damper member 14 is a cylindrical member whose thickness in the radial direction is constant, and a dimension (height) in the direction of the axis line L is also constant. The gel damper member 14 is formed of a silicone gel. The gel damper member 14 is formed of a silicone gel. For example, as the gel damper member 14, a silicone gel in which the degree of penetration is 90 to 110 degrees can be used.

In the first gel damper member 14A, an inner circumferential portion 141 is connected to the inner annular member 36B, and an outer circumferential portion 142 is connected to the frame part 45 of the first holder 4B. In the second gel damper member 14B, an inner circumferential portion 141 is connected to the inner annular member 37B, and an outer circumferential portion 142 is connected to the frame part 56 of the second holder 5B. When the first gel damper member 14A and the second gel damper member 14B are connected to the members arranged on the inner circumferential side and the outer circumferential side thereof, the same method as used for molding the gel damper member 14 between the first member 11 and the second member 12 in embodiment 1 is performed.

For example, the inner annular member 36B and the first holder 4B are mounted on a jig to form a predetermined gas between the inner annular member 36B and the frame part 45 of the first holder 4B, and the gel material is filled in the gap and is thermally cured. Before the gel material is filled, a primer 13 is applied to the outer circumferential surface of the inner annular member 36B and the inner circumferential surface of the frame part 45. In this way, when the gel material is thermally cured, the parts thereof in contact with the primer 13 react, and, by the adhesive force of the first gel damper member 14A itself, the inner circumferential portion 141 of the first gel damper member 14A is fixed to the inner annular member 36B and the outer circumferential portion 142 of the first gel damper member 14A is fixed to the frame part 45. The second gel damper member 14B is also molded between the inner annular member 37B and the frame part 56 of the second holder 5 by the same method.

In the actuator 1B of embodiment 3, as in embodiment 1, the coil 62 is energized, and thus the magnetic drive mechanism 6 generates a drive force for driving the movable member 3B in the direction of the axis line L, with the result that the movable member 3B is vibrated in the direction of the axis line L. The gel damper members 14 are filled between the inner annular member 36B and the frame part 45 and between the inner annular member 37B and the frame part 56 without any gap, and are continuously arranged over the entire circumference. When the movable member 3B is vibrated on the fixed member 2B in the direction of the axis line L, the gel damper member 14 is deformed in the shearing direction so as to follow the vibration of the movable member 3B.

Main Effects of Embodiment 3

As described above, in the actuator 1B of embodiment 3, the gel damper members 14 serving as the connection members which connect the movable member 3B and the fixed member 2B are arranged at the two places between the inner annular member 36B which is an inner circumferential side part provided in the movable member 3 and the frame part 45 which is an outer circumferential side part provided in the fixed member 2B and between the inner annular member 37B which is an inner circumferential side part provided in the movable member 3B and the frame part 56 which is an outer circumferential side part provided in the fixed member 2B. Each of the gel damper members 14 is continuously arranged in the gap in the radial direction between the movable member 3B and the fixed member 2B over the entire circumference, the inner circumferential portion 141 of the gel damper member 14 is connected to the movable member 3B and the outer circumferential portion 142 of the gel damper member 14 is connected to the fixed member 2B. Hence, it is possible to reduce the movement of the movable member 3B in a direction different from the direction of the vibration (direction of the axis line L). Therefore, it is possible to reduce the movement of the movable member 3B in an unintended direction, and thus it is possible to reduce the collision of the movable member 3B and the fixed member 2B.

Embodiment 3 is the same as embodiments 1 and 2 in that the gel damper members 14 are arranged at both the ends of the movable member 3B in the direction of the axis line L and that the gel damper members 14 are cylindrical. Hence, in these respects, the same operational effects as in embodiment 1 can be obtained.

Embodiment 3 is also the same as embodiment 2 in that the weights (inner annular members 36B an 37B) for adjusting the mass of the movable member 3B are used as the frame members to which the inner circumferential portions 141 of the gel damper members 14 are connected and that the coil holder 70 (holder member) including the coil fixing portion 72 and the first holder 4B (outer circumferential side member) including the frame part 45 used as the frame member when the gel damper member 14 is molded are separate components. Embodiment 3 is also the same as embodiment 2 in that when the gel damper member 14 is manufactured, the gel material 140 is filled between the component on the side of the movable member 3B and the component on the side of the fixed member 2B to which the primer 13 is applied and is thermally cured, and thus the primer 13 and the gel material are caused to react with each other, with the result that, by the adhesive force of the gel damper member 14 itself, the component on the side of the movable member 3B and the component on the side of the fixed member 2B are connected. Hence, in these respects, the same operational effects as in embodiment 2 can be obtained.

Variation 1

Figure 10:
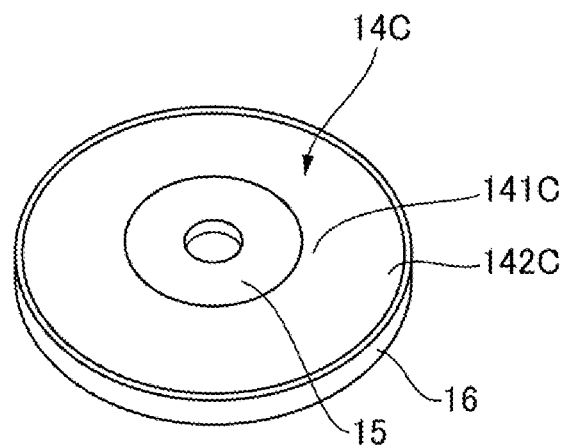
FIG. 10 is a perspective view and a side view of the gel damper member of variation 1.
Figure 10:
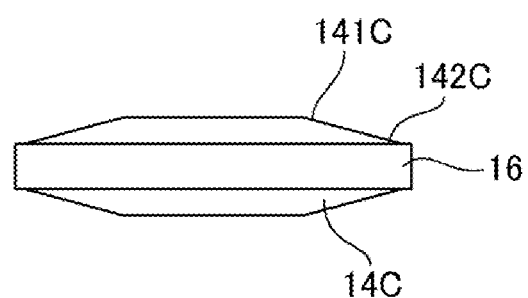

As the forms of the gel damper member 14 of the embodiments described above, the forms of variations below can be adopted. (a) of FIG. 10 is a perspective view of the gel damper member 14C of variation 1, and (b) of FIG. 10 is a side view of the gel damper member 14C of variation 1. (a) and (b) of FIG. 10 show, together with the gel damper member 14C, an inner frame member 15 to which the inner circumferential portion 141C of the gel damper member 14C is fixed and an outer frame member 16 to which the outer circumferential portion 142C of the gel damper member 14C is fixed. One of the inner frame member 15 and the outer frame member 16 is fixed to a movable member, and the other of the inner frame member 15 and the outer frame member 16 is fixed to a fixed member. The inner frame member 15 and the outer frame member 16 are cylindrical. The height H1 of the inner frame member 15 in the direction of the axis line L is smaller than the height H2 of the outer frame member 16 in the direction of the axis line L.

In the gel damper member 14C of variation 1, the height of the inner circumferential portion 141C is equal to that of the inner frame member 15, and the height of the outer circumferential portion 142C is equal to that of the outer frame member 16. Hence, in the gel damper member 14C, the height of the inner circumferential portion 141C in the direction of the axis line L is greater than that of the outer circumferential portion 142C in the direction of the axis line L. In this way, an area difference between the area of the gel damper member 14 fixed to the inner frame member 15 and the area of the gel damper member 14 fixed to the outer frame member 16 can be reduced as compared with a case where the heights of the inner circumferential portion 141C and the outer circumferential portion 142C in the direction of the axis line L are equal to each other, with the result that the concentration of stress at the inner circumferential portion 141C can be reduced. As described above, the concentration of stress at the gel damper member 14C is reduced, and thus it is possible to increase the allowable range of an amplitude when the movable member is vibrated. Hence, the movable member can be vibrated with a large amplitude. It is also possible to enhance the durability of the gel damper member 14C.

Variation 2

Figure 11:
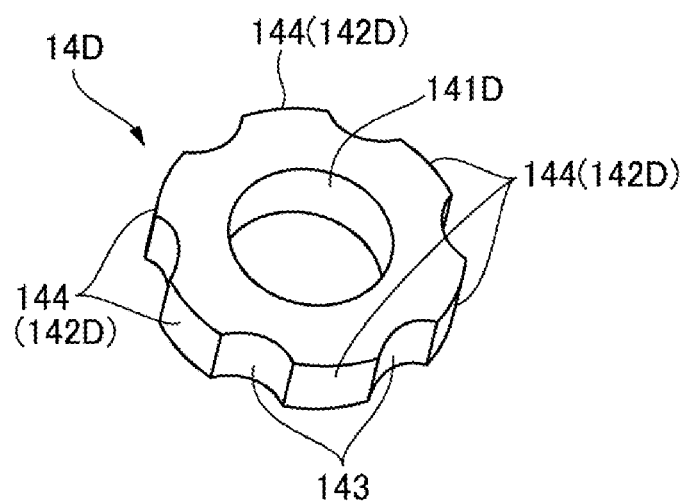
FIG. 11 is an illustrative view of the gel damper members of variations 2 and 3.
Figure 11:
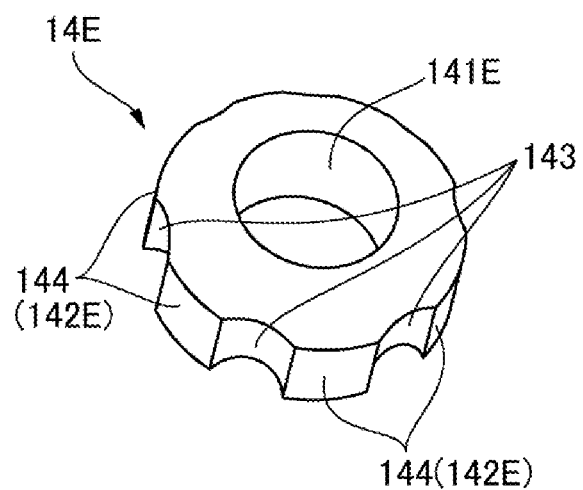

(a) of FIG. 11 is a perspective view of the gel damper member 14D of variation 2. In the gel damper member 14D of variation 2, as in the embodiments described above, an inner circumferential portion 141D is annular. Hence, the entire circumference of the inner circumferential portion 141D is connected to one of a movable member and a fixed member. On the other hand, the outer circumferential portion 142D of the gel damper member 14D includes, in part in a circumferential direction, recess portions 143 which are recessed toward an inner circumferential side, and parts of arc-shaped outer circumferential surfaces 144 other than the recess portions 143 are connected to the other of the movable member and the fixed member.

In variation 2, an area difference between an area fixed to the inner circumferential portion 141D and an area fixed to the outer circumferential portion 142D can be reduced by an area corresponding to the provision of the recess portions 143 in the outer circumferential surface, and thus the concentration of stress at the inner circumferential portion 141D can be reduced. As described above, the concentration of stress at the gel damper member 14D is reduced, and thus it is possible to increase the allowable range of an amplitude when the movable member is vibrated. Hence, the movable member can be vibrated with a large amplitude. It is also possible to enhance the durability of the gel damper member 14D.

Variation 3

(b) of FIG. 11 is a perspective view of the gel damper member 14E of variation 3. In the gel damper member 14E of variation 3, the height of an inner circumferential portion 141E in the direction of the axis line L is greater than that of an outer circumferential portion 142E in the direction of the axis line L. In addition, in the gel damper member 14E of variation 3, recess portions 143 which are recessed toward an inner circumferential side and arc-shaped outer circumferential surfaces 144 which are not recessed toward the inner circumferential side are alternately provided in the outer circumferential portion 142E. Hence, in variation 3, an area difference between an area fixed to the inner circumferential portion 141E and an area fixed to the outer circumferential portion 142E can be reduced, and thus the concentration of stress at the inner circumferential portion 141E can be reduced. As described above, the concentration of stress at the gel damper member 14E is reduced, and thus it is possible to increase the allowable range of an amplitude when the movable member is vibrated. Hence, the movable member can be vibrated with a large amplitude. It is also possible to enhance the durability of the gel damper member 14E.

The invention claimed is:

1. An actuator comprising:
a movable member that includes a shaft extending in a direction of an axis line and one of a magnet and a coil which is held by the shaft;
a fixed member that includes a tubular case which extends in the direction of the axis line and surrounds an outer circumferential side of the movable member, and the other of the magnet and the coil which is held in an inside of the tubular case; and
a connection member that connects the fixed member and the movable member,
wherein the magnet and the coil form a magnetic drive mechanism that vibrates the movable member in the direction of the axis line relative to the fixed member,
the movable member includes an inner circumferential side part that is arranged on an inner circumferential side of the fixed member,
the fixed member includes an outer circumferential side part that surrounds an outer circumferential side of the inner circumferential side part,
the connection member continuously surrounds an entire circumference of the inner circumferential side part,
an inner circumferential portion of the connection member is connected to the inner circumferential side part of the movable member and an outer circumferential portion of the connection member is connected to the outer circumferential side part of the fixed member, and
the connection member is provided on one end side and the other end side of the movable member in a direction of the vibration on both sides in the direction of the axis line with respect to the one of the magnet and the coil which is fixed to the shaft.

2. The actuator according to claim 1,
wherein the connection member is formed with a gel damper member.

3. The actuator according to claim 1,
wherein the connection member is cylindrical.

4. The actuator according to claim 1,
wherein a height of the inner circumferential portion of the connection member is greater than a height of the outer circumferential portion.

5. The actuator according to claim 1,
wherein the inner circumferential portion is connected to the inner circumferential side part over the entire circumference, and
part of the outer circumferential portion in a circumferential direction is connected to the outer circumferential side part.

6. The actuator according to claim 1,
wherein the connection member is arranged between a cylindrical first member and a cylindrical second member arranged on an outer circumferential side of the first member so as to connect the first member and the second member,
the inner circumferential portion is connected through the first member to the inner circumferential side part over the entire circumference and
an entire circumference of the outer circumferential portion is connected through the second member to the outer circumferential side part or part of the outer circumferential portion in a circumferential direction is connected through the second member to the outer circumferential side part.

7. The actuator according to claim 1,
wherein the movable member includes an inner annular member arranged on an inner circumferential side of the connection member,
the inner annular member is a weight for adjusting mass of the movable member and
the inner circumferential side part to which the connection member is fixed is provided in the inner annular member.

8. The actuator according to claim 1,
wherein the fixed member includes
a holder member including a coil fixing portion on which the coil is wound and
an outer annular member fixed to the holder member, and
the outer circumferential side part to which the connection member is fixed is provided in the outer annular member.

9. An actuator comprising:
a movable member that includes one of a magnet and a coil;
a fixed member that includes the other of the magnet and the coil; and
a connection member that connects the fixed member and the movable member,
wherein the magnet and the coil form a magnetic drive mechanism that vibrates the movable member relative to the fixed member,
one of the movable member and the fixed member includes an inner circumferential side part that is arranged on an inner circumferential side of the other of the movable member and the fixed member,
the other of the movable member and the fixed member includes an outer circumferential side part that surrounds an outer circumferential side of the inner circumferential side part,
the connection member continuously surrounds an entire circumference of the inner circumferential side part and
an inner circumferential portion of the connection member is connected to the inner circumferential side part and an outer circumferential portion of the connection member is connected to the outer circumferential side part,
wherein the movable member includes an inner annular member arranged on an inner circumferential side of the connection member,
the inner annular member is a weight for adjusting mass of the movable member and
the inner circumferential side part to which the connection member is fixed is provided in the inner annular member.

10. The actuator according to claim 9,
wherein the fixed member surrounds an outer circumferential side of the movable member, and
the inner circumferential portion of the connection member is connected to the inner circumferential side part provided in the movable member and the outer circumferential portion of the connection member is connected to the outer circumferential side part provided in the fixed member.

11. The actuator according to claim 9,
wherein the connection member connects the movable member and the fixed member on one end side and the other end side of the movable member in a direction of the vibration.

12. The actuator according to claim 9,
wherein the connection member is formed with a gel damper member.

13. The actuator according to claim 9,
wherein the connection member is cylindrical.

14. The actuator according to claim 9,
wherein the fixed member includes
- a holder member including a coil fixing portion on which the coil is wound and
- an outer annular member fixed to the holder member, and
- the outer circumferential side part to which the connection member is fixed is provided in the outer annular member.

15. An actuator comprising:
a movable member that includes one of a magnet and a coil;
a fixed member that includes the other of the magnet and the coil; and
a connection member that connects the fixed member and the movable member,
wherein the magnet and the coil form a magnetic drive mechanism that vibrates the movable member relative to the fixed member,
one of the movable member and the fixed member includes an inner circumferential side part that is arranged on an inner circumferential side of the other of the movable member and the fixed member,
the other of the movable member and the fixed member includes an outer circumferential side part that surrounds an outer circumferential side of the inner circumferential side part,
the connection member continuously surrounds an entire circumference of the inner circumferential side part,
an inner circumferential portion of the connection member is connected to the inner circumferential side part and an outer circumferential portion of the connection member is connected to the outer circumferential side part,
wherein the inner circumferential portion is connected to the inner circumferential side part over the entire circumference, and
part of the outer circumferential portion in a circumferential direction is connected to the outer circumferential side part.

16. The actuator according to claim 15,
wherein the fixed member surrounds an outer circumferential side of the movable member, and
the inner circumferential portion of the connection member is connected to the inner circumferential side part provided in the movable member and the outer circumferential portion of the connection member is connected to the outer circumferential side part provided in the fixed member.

17. An actuator comprising:
a movable member that includes one of a magnet and a coil;
a fixed member that includes the other of the magnet and the coil; and
a connection member that connects the fixed member and the movable member,
wherein the magnet and the coil form a magnetic drive mechanism that vibrates the movable member relative to the fixed member,
one of the movable member and the fixed member includes an inner circumferential side part that is arranged on an inner circumferential side of the other of the movable member and the fixed member,
the other of the movable member and the fixed member includes an outer circumferential side part that surrounds an outer circumferential side of the inner circumferential side part,
the connection member continuously surrounds an entire circumference of the inner circumferential side part and
an inner circumferential portion of the connection member is connected to the inner circumferential side part and an outer circumferential portion of the connection member is connected to the outer circumferential side part,
wherein the connection member is arranged between a cylindrical first member and a cylindrical second member arranged on an outer circumferential side of the first member so as to connect the first member and the second member,
the inner circumferential portion is connected through the first member to the inner circumferential side part over the entire circumference and
an entire circumference of the outer circumferential portion is connected through the second member to the outer circumferential side part or part of the outer circumferential portion in a circumferential direction is connected through the second member to the outer circumferential side part.

18. The actuator according to claim 17,
wherein the fixed member surrounds an outer circumferential side of the movable member, and
the inner circumferential portion of the connection member is connected to the inner circumferential side part provided in the movable member and the outer circumferential portion of the connection member is connected to the outer circumferential side part provided in the fixed member.

* * * * *